United States Patent [19]

Koch et al.

[11] 4,059,375
[45] Nov. 22, 1977

[54] VEHICLE WHEEL PNEUMATIC TYRES AND THE MANUFACTURE THEREOF

[75] Inventors: Friedrich Koch, Achim; Lothar Fink, Achim-Baden, both of Germany

[73] Assignee: Sopecom S.A. Fribourg, Fribourg, Switzerland

[21] Appl. No.: 671,782

[22] Filed: Mar. 30, 1976

[30] Foreign Application Priority Data

Apr. 5, 1975 Germany .............................. 2514973

[51] Int. Cl.² .......................... B29C 5/00; B29H 3/08; B29H 5/02
[52] U.S. Cl. ..................................... 425/589; 425/32; 425/130; 425/47
[58] Field of Search ....................... 425/13, 32, 35, 38, 425/46, 47, 52, 129 S, 130, 242; 249/107; 156/125, 330

[56] References Cited

U.S. PATENT DOCUMENTS

| | | | |
|---|---|---|---|
| 2,476,884 | 7/1949 | Maynard | 425/52 X |
| 2,672,914 | 3/1954 | Weigold et al. | 425/32 X |
| 2,724,425 | 11/1955 | Ostling | 156/125 |
| 2,744,290 | 5/1956 | Corson | 425/13 |
| 2,799,435 | 7/1957 | Abplanalp | 249/107 X |
| 2,878,517 | 3/1959 | Cramer | 249/107 |
| 3,123,122 | 3/1964 | Beckadolph | 156/330 |
| 3,319,300 | 5/1967 | Helhl | 425/130 X |
| 3,553,778 | 1/1971 | Woodhall | 425/47 X |
| 3,609,819 | 10/1971 | Searle | 425/47 |
| 3,645,655 | 2/1972 | Benege | 425/35 |
| 3,671,621 | 6/1972 | Fukuoka | 425/129 S X |
| 3,697,206 | 10/1972 | Bonazzi | 425/38 X |
| 3,787,155 | 1/1974 | Zangl | 425/47 |
| 3,797,979 | 3/1974 | Greenwood | 425/47 |
| 3,838,960 | 10/1974 | Lovejoy | 249/107 X |
| 3,868,203 | 2/1975 | Turk | 425/242 |
| 3,901,632 | 8/1975 | Prosdocimi | 425/47 |
| 3,914,081 | 10/1975 | Aoki | 425/130 |
| 3,922,122 | 11/1975 | Bottasso et al. | 425/47 X |

*Primary Examiner*—J. Howard Flint, Jr.
*Attorney, Agent, or Firm*—Sughrue, Rothwell, Mion, Zinn and Macpeak

[57] ABSTRACT

An apparatus for producing tires suitable for use on vehicles from elastomers, especially from rubber by injection-molding is disclosed. The apparatus has a multi-part cord defining an inner side of a mold cavity for receiving separately prefabricated reinforcements of the tire. The cord can be reduced in size to define the external periphery by relative displacement of individual parts for the removal of the tire from the mold. The mold core with the reinforcements is inserted into a multi-part injection mold by which the core is completely enclosed.

11 Claims, 12 Drawing Figures

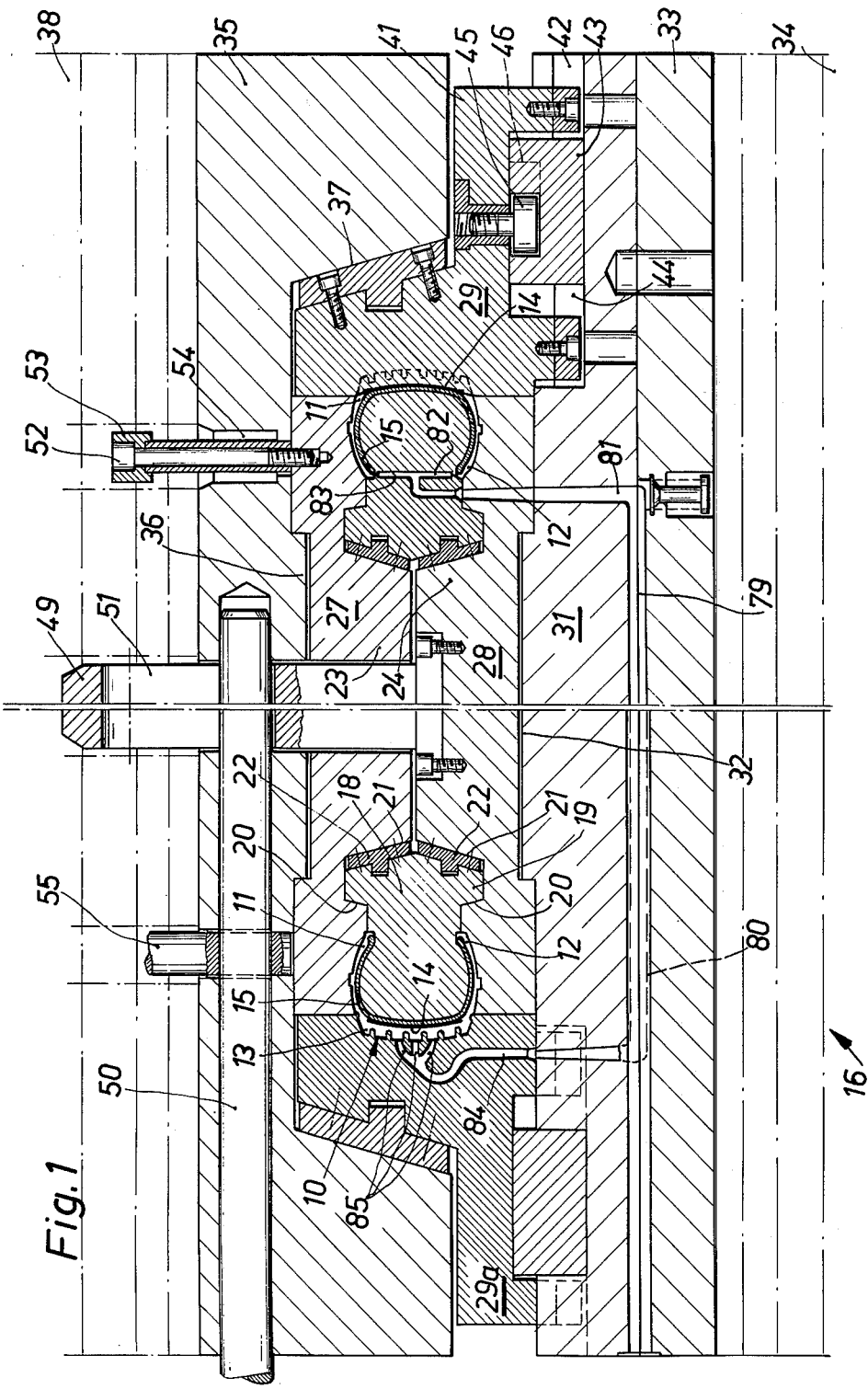

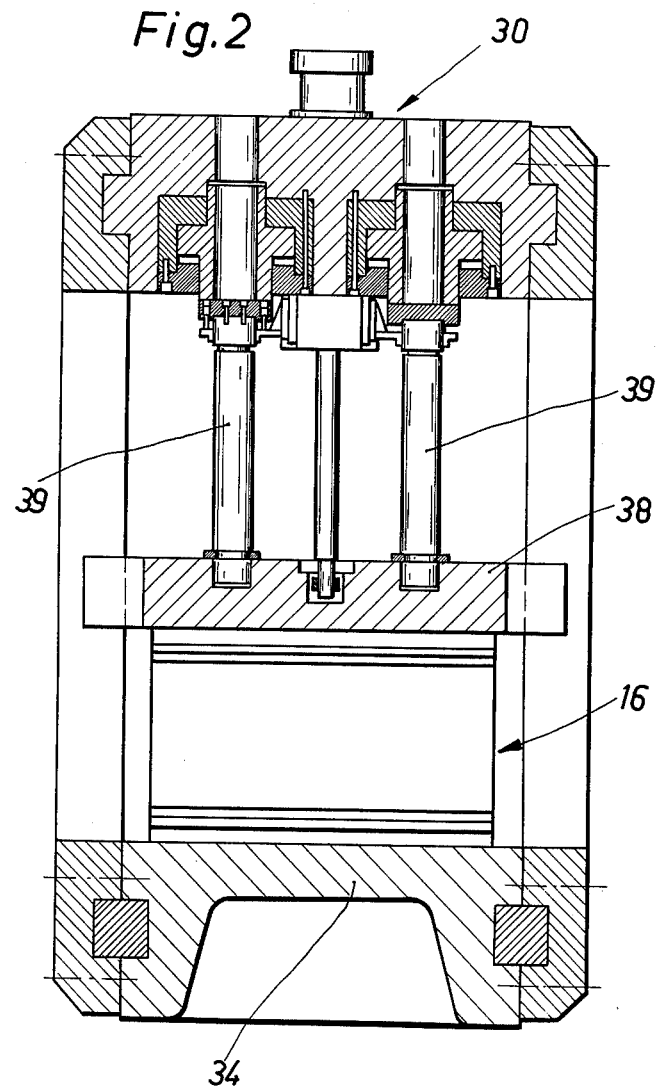

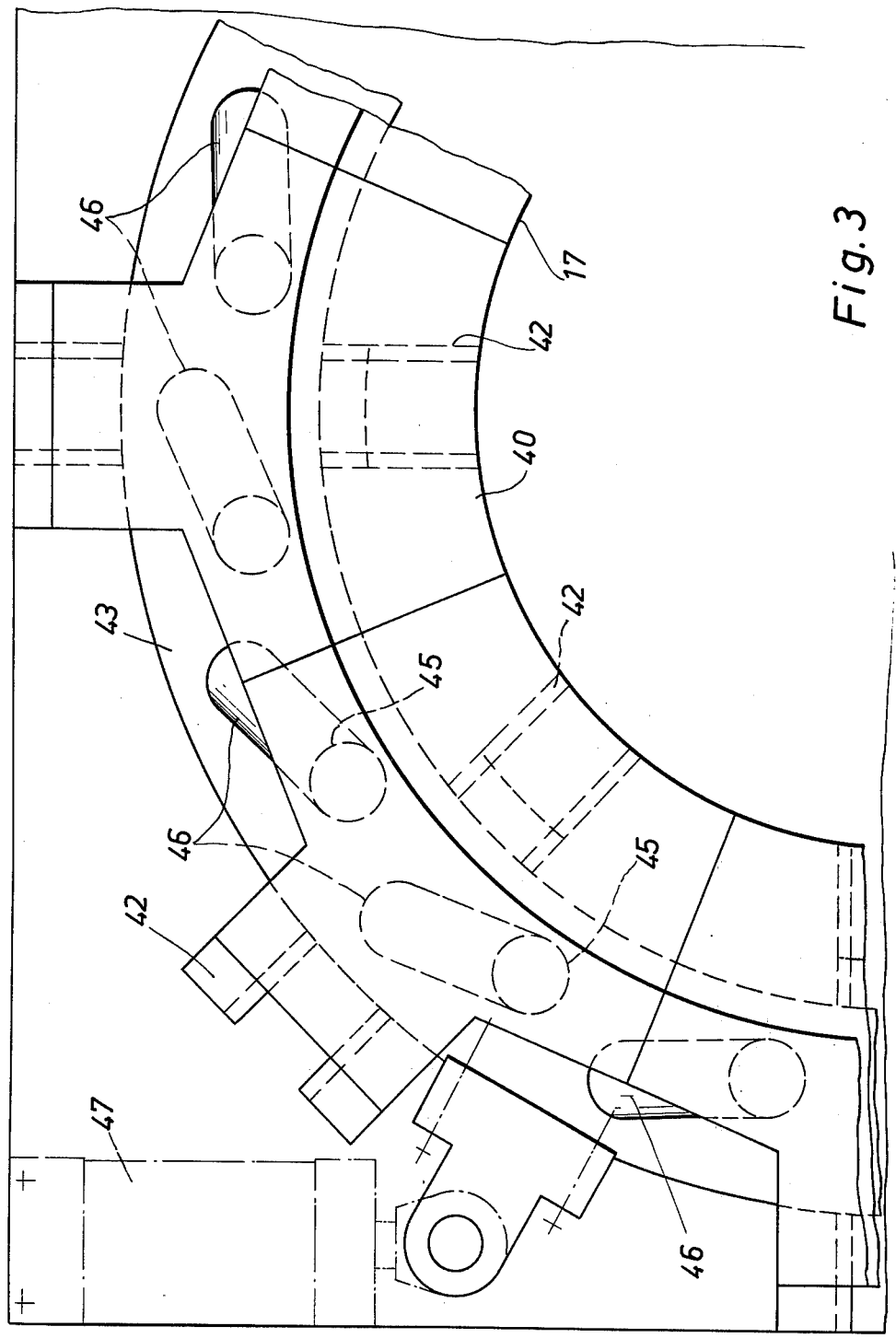

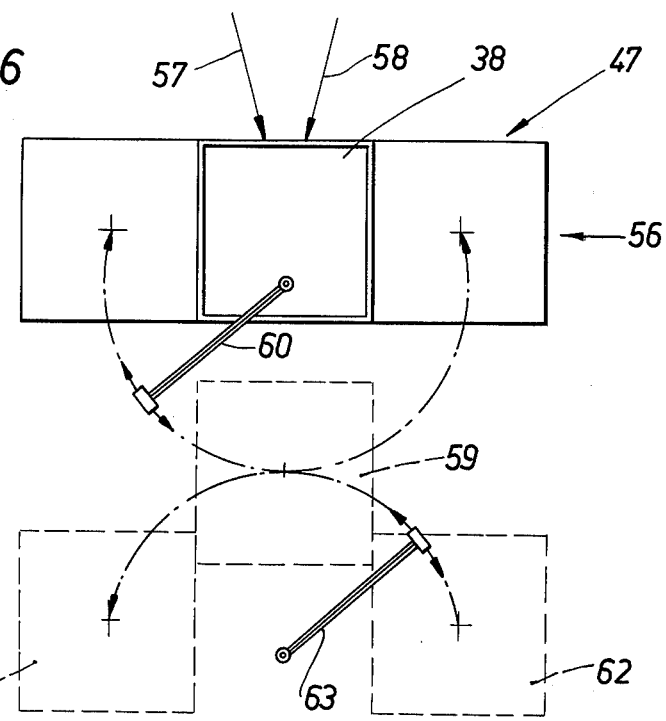
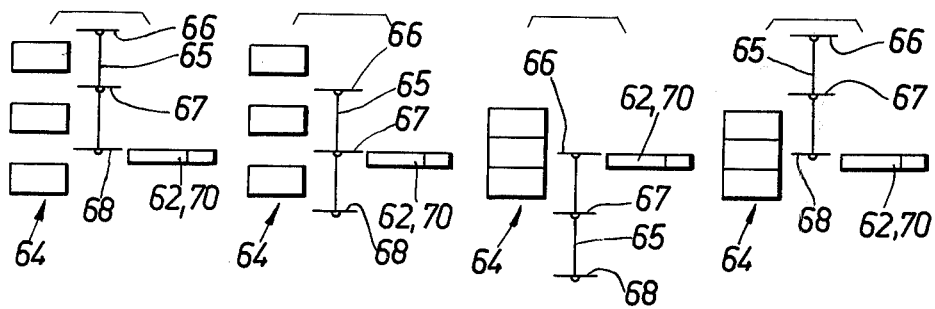

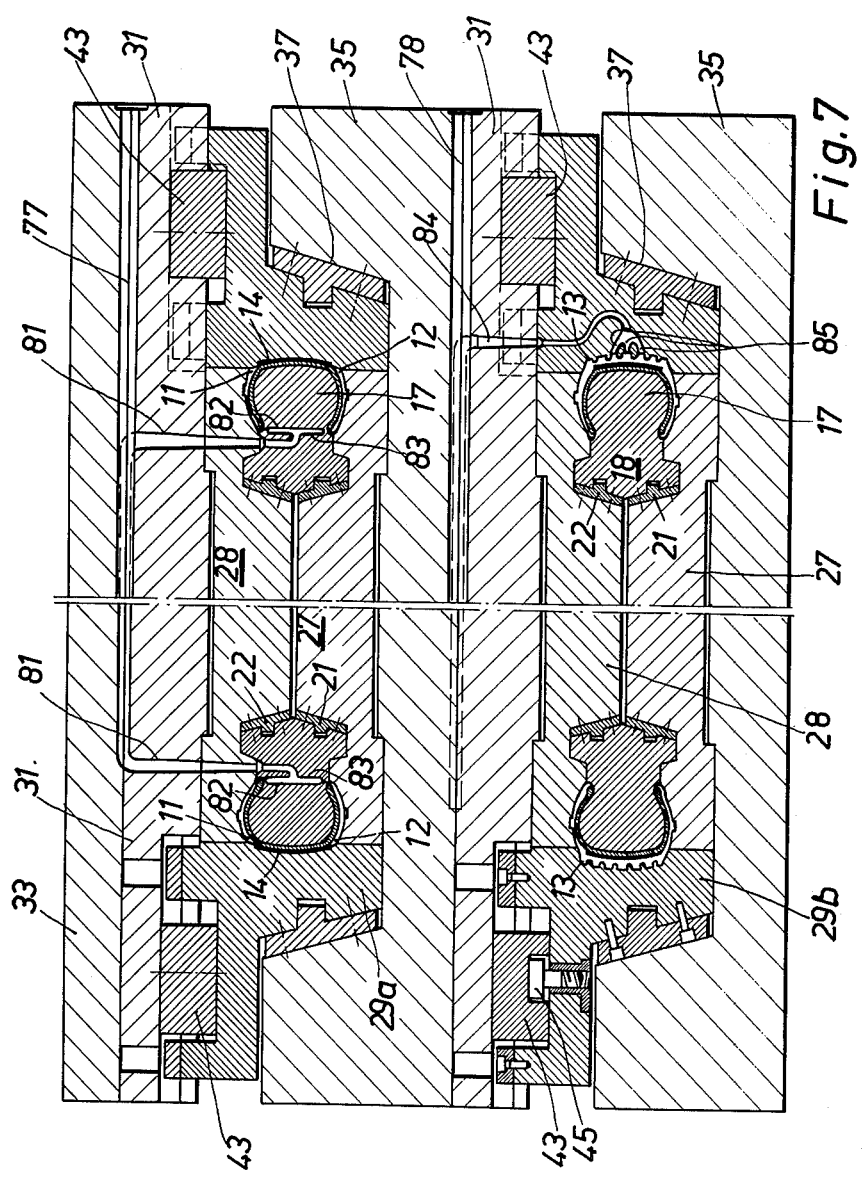

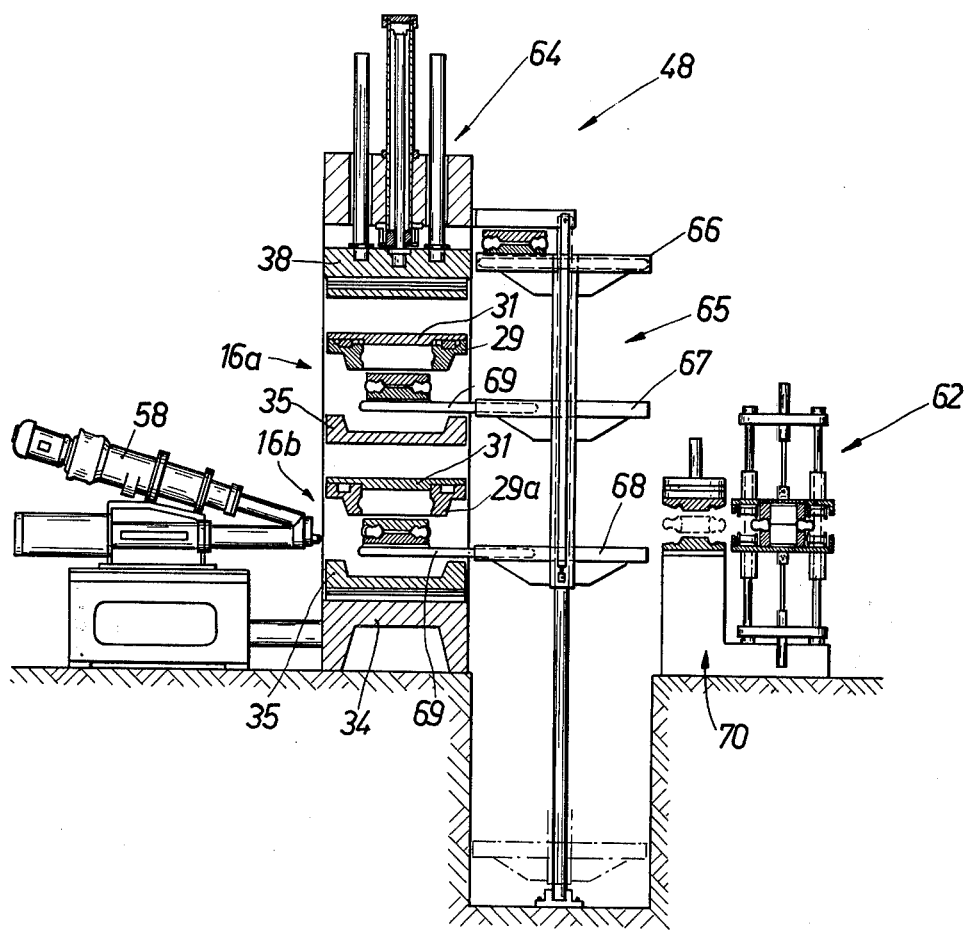

VEHICLE WHEEL PNEUMATIC TYRES AND THE MANUFACTURE THEREOF

This invention is concerned with injection-moulding, especially rubber, and with an apparatus for the production of tyres.

Vehicle pneumatic tyres hitherto have consisted, at least in practice, of rubber. Production takes place in conventional vulcanising presses. The starting parts, fabric inserts, belts, raw rubber, are manually prefabricated in tyre-building machines and then fed to the vulcanising press. The expense caused by this technique is considerable.

The mould cores used in such vulcanising presses are made as inflatable mould parts. The loud capacity of such cores is limited, but adequate for the pressures occurring in vulcanising presses.

"Mechanical" cores are also used for the production of pneumatic tyres. These cores consist of a plurality of individual parts of stable form which are displaceable in relation to one another, in such a way that the external periphery of the core can be reduced, for the withdrawal of the pneumatic tyre from the mould, that is to say removal from the core.

The invention is concerned with injection-moulding, preferably of rubber, but also from other injectable materials, especially polyurethane.

The production of pneumatic tyres by injection-moulding from elastomers is fundamentally already known. In this known process the pneumatic tyre is produced in two halves. The two finished tyre halves are then connected with one another in a longitudinal central plane of the tread by adhesion or welding. This process is disadvantageous in that the pneumatic tyre consists of two separately produced and subsequently assembled parts. The durable union of the tyre thus formed is not thus effected with adequate security. Furthermore it is not possible for the reinforcements usual in vehicle pneumatic tyres, namely belts and/or carcass, to be embedded as a uniform part into the material of the pneumatic tyre. In this process these reinforcements must also necessarily be divided.

The production of vehicle tyres by injection-moulding involves a plurality of problems. The reason for this is in that in practice, work is carried on almost exclusively with conventional vulcanising presses. The problems occurring in injection-moulding take effect especially in the processing of rubber, since this material requires and causes extremely high injection pressures and thus internal mould pressures. Moreover hitherto no rubber materials has been available for the production of the tyre from one material and thus in one piece. In the processing of rubber there is accordingly also the problem of a design configuration of the tyre which satisfies the injection-moulding process and the material to be processed.

The problem on which the invention is based consists in proposing a novel apparatus which deals with the problems of injection-moulding of tyres, especially from rubber.

The tyre produced by the mold according to the invention, along the lines of this problem, is characterised in that it has a plurality of parts, generally three, produced in two successive injection actions, namely preferably two side parts on the one hand and a tread on the other, preferably of different materials, which are connected with one another by setting of the materials, especially by completion of vulcanisation. In the production of such a tyre the procedure is that in a first injection action the side parts are formed and then partially vulcanised in appropriately formed mould cavities. Then the material for the tread is injected into a mould cavity provided for this purpose and at the same time connected with the partially vulcanised side parts previously produced. Side parts and tread are then completely vulcanised and in this operation joined together into a homogeneous unit.

The tyre produced according to the invention, although produced in parts, can be regarded as a uniform workpiece. It is also possible to mould prefabricated one-piece reinforcements into the tyre, especially belt and elements. These parts are received in the mould cavity for the side parts and the tread.

One particular theme of the invention is the development of apparatus suitable for the production of tyres by injection-moulding of rubber, polyurethane, etc., with a core receiving the tyre. This core consists of several parts (segments) which can be driven together.

With this statement of problem, the development of the other parts of the injection mould in detail and of the tyre injection plant as a whole is also an object of the invention. One essential concern is the possibility of assembling the mould consisting of several parts in such a way that in the closed position extremely high closure pressures can be exerted upon the mould parts, which are a prerequisite for the processing of rubber. The injection-mould according to the invention is formed so that the core with reinforcements (belt, carcass) possibly drawn on to it is completely enclosed by the multi-part mould. The latter consists at least of an upper mould part, a lower mould part and an outer mould part. A mould cavity for the side parts of the pneumatic tyre is formed in each case in the upper and lower mould parts, while the outer mould part is equipped with the mould cavity for the reception of the tread.

Several injection moulds, especially two, are part of an injection plant. Each injection mould is divided into mould component sets, namely a mould component set (outer mould part, mould carrier plate for its mounting, possibly closer element) which is substantially stationary or movable only in relation to a stationary injection unit, and a displaceable mould component set, consisting of cure, upper mould part and lower mould part. This movable mould component set is moved according to the production process between the stationary mould component sets and a core withdrawal station.

Several injection moulds are allocated to a common press, especially in an arrangement one above the other. The moulds are simultaneously closed and charged with injection material by the common press. The displaceable component sets travel within the press — in the open position — from injection mould to injection mould, a part of the moulding being produced in each case.

The removal of the finished tyre from the core is carried out according to the invention in a separate core withdrawal station. This is equipped with force-exerting elements, especially pressure medium cylinders, with the aid of which the individual segments of the core can be moved towards the centre point for the contraction of the core.

The invention will be explained in greater detail hereinafter by reference to examples of embodiment thereof which are illustrated in the accompanying drawings, wherein:

FIG. 1 shows a radial vertical cross-section through an injection mould for the production of pneumatic tyres, FIG. 2 shows a vertical section through a press station with an injection mould according to FIG. 1, FIG. 3 shows a detail of the injection mould, namely the outer mould part, in plan view, FIG. 4 shows a further detail of the injection mould, namely the course of injection passages, in plan view, FIG. 5 shows a further detail of the injection mould, namely the course of further injection passages, in plan view, FIG. 6 shows a tyre injection plant in diagrammatic representation in plan view, FIG. 7 shows two injection moulds for the production of tyres arranged one above the other, in vertical section, FIG. 8 shows an illustration corresponding to FIG. 7 with the mould parts of the injection mould drawn apart, on a reduced scale, FIG. 9 shows a complete tyre injection plant with core withdrawal station, in vertical section, FIG. 10 shows a diagrammatic representation of the course of work in a tyre injection plant according to FIG. 9,.

Figure 5:
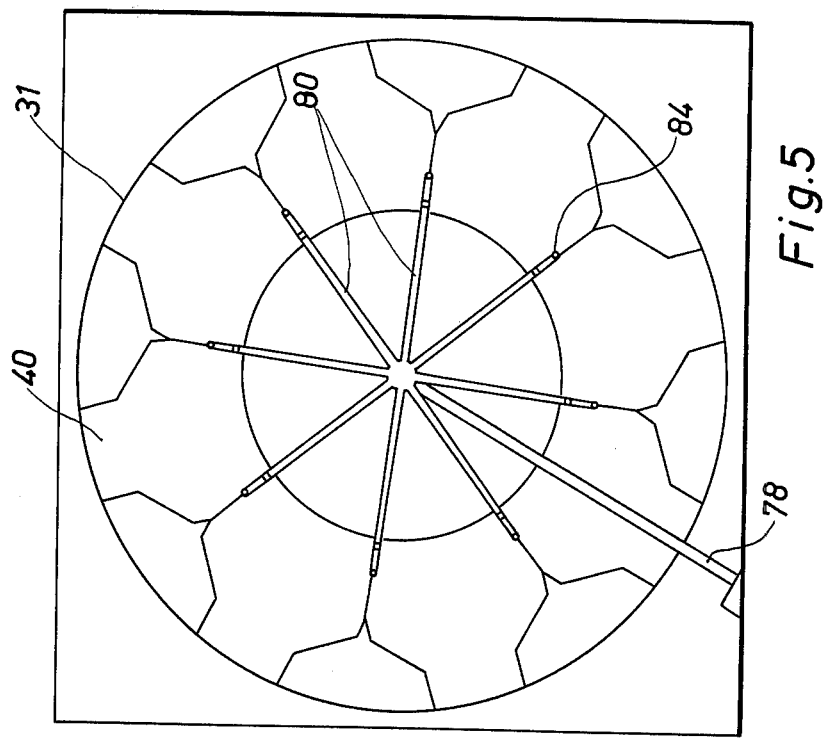

In the drawings, the production of vehicle tyres 10 by injection-moulding, especially by processing rubber, is connected in the present case with a special design configuration of the tyre. The tyre is in fact formed from three parts which are produced in two successive injection actions and connected with one another. The first action concerns two side parts 11 and 12 and the other a tread 13. The side parts 11 and 12 are moulded in a first injection action and the tread 13 in a second. After the injection of the side parts 11 and 12 the material is firstly partially consolidated by vulcanisation is up to about 70%. Then the tread 13 is produced and connected with the partially vulcanization side parts 11 and 12 by common vulcanization to completion, so that in the final effect a one-piece pneumatic tyre 10 is produced. The side parts 11 and 12 on the one hand and the tread 13 on the other can here consist of different materials.

The above-mentioned division of the production process makes it possible to work prefabricated one-piece reinforcements, for example a belt 14 and a carcass 15, into the pneumatic tyre. These insert parts are introduced into the mould cavity for the side parts 11 and 12 and the tread 13 before the injection moulding.

The tyre 10 can be produced in an injection mould 16 or 16a, 16b, an example of embodiment of which is shown in FIG. 1. The injection mould 16 is equipped with a solid core 17, the radially outer zone of the core 17 is adapted, as may be seen from FIG. 1, to the internal contour of the tyre 10 to be produced, or serves for the reception of a prefabricated carcass 15. The radially inner side this outer zone is joined by an extension 18 with foot-like widening 19. The foot-like widening 19 is formed upwards and downwards, that is in the axial direction of the core, with converging engaging faces 20 and 21 respectively. The radially inner upper and lower engaging faces 21, directed towards one another at an angle, are equipped with a wear piece 22 of plate form attached replaceably to the widening 19. The above-mentioned engaging faces 20 and 21 and the wear piece 22 serve for the exact centering of the core in relation to the adjoining mould parts. The core is made in a plurality of parts, consisting of a plurality of segments, for dismantlement.

After the removal of a tyre 10 from the mould, the core 17 is prepared for the next injection action outside the injection mould 16. Any reinforcements proposed, namely carcass 15 and belt 14, are drawn on to the core 17 in the assembled position. Since adequate fixing of the belt 14 which, the initial position is approximately cylindrical, in the injection mould is problematical, here the belt 14 is so dimensioned that it is seated with a certain tension on the core 17 or on the carcass 15. Due to this tension the belt 14 is additionally fixed in relation to the forces occurring in injection, and also slightly convexly shaped in cross-section.

The injection mould 16 for the reception of the core 17 is of multi-part formation, namely so that the core 17 is completely enclosed. For this purpose the core 17 is received between an upper mould part 27 and a lower mould part 28. These mould parts are provided with recesses in which the core with the extension 18 and the widening 19 fits. A centering cone 23 as part of the upper mould part and a cone 24 as part of the lower mould part enter the central space of the core 17 from above and beneath respectively. The upper mould part 27 and lower mould part 28 are provided with mould cavities for the reception of the side part 11 and 12 of the tyre, including the side parts of the carcass 15. In the radially outer zone the above-mentioned mould parts 27 and 28 terminate with the external limitation of the side parts 11 and 12.

The tread 13 of the tyre 10 is shaped by an outer mould part 29 or 29a which is equipped with a corresponding mould cavity. The outer mould part encloses the core 17 and the upper and lower mould parts 27 and 28.

The outer mould part is configured differently for the execution of the injection-moulding process in two actions. During the first injection action for the production of the side parts 11 and 12 the outer mould part 29 (FIG. 1, right half) is shaped so that the mould cavity for the side parts 11 and 12 is radially outwardly defined by the outer mould part 29 formed without mould cavity and fitting against the belt 14. For the second injection action (FIG. 1, left) an outer mould part 29a is used which is equipped with the mould cavity for the tread 13 adjoining the side parts 11 and 12.

The present injection mould, in the embodiment with the outer mould part 29a, is suitable for the production of one-piece tyres in one injection action.

The above-described mould parts are received between upper and lower thrust pieces of a press 30 of a construction type known in principle, as illustrated in an example of embodiment in FIG. 2. The press 30 has primarily the task of holding together in the closed position the mould parts forming the injection mould, in such a way that no relative displacement takes place during the injection operation.

The upper mould part 20 and the outer mould part 29 or 29a in the present embodiment are arranged on a mould carrier plate 31. On its upper side this has a central prominence 32 which fits into a recess of the lower mould part 28 for the centering of the latter. The mould carrier plate 31 in turn lies on an under plate 33. Beneath the under plate 33, as known in principle, there are arranged heating plate, insulating plate, cooling plate and finally the base plate 34 of the press.

The upper mould part 27 and the upper region of the outer mould part 29 or 29a are surrounded by an upper thrust element in the form of a closure bell 35. This likewise is provided with a central prominence 36 for the centering of the upper mould part 27. The outer mould part 29 or 29a is equipped in the zone surrounded by the closure bell 35 with centering surfaces 37 converging towards the closure bell 35, which are fittingly surrounded by corresponding counter-surfaces of the closure bell.

Above the closure bell 35 there follow, as known in principle, the heating plate, insulating plate, cooling plate and thrust plate 38 for transmission of the closure pressure exerted for example by four pressure-medium-operated columns 39.

The outer mould part 29 or 29a is moveable radially in relation to the core 17 for the assembling and separation of the injection mould 16. For this purpose the outer mould part consists of a plurality of external segments 40, as shown in FIG. 3 namely for example 8, with radially directed separating surfaces. The outer segments 40 lie with a foot 41 on the mould carrier plate 31 and are radially displaceable thereon, with the aid of separate slider guides 42.

To carry out the opening and closing movements of the outer mould part 29, 29a a thrust ring 43 is provided. This is mounted on the mould carrier plate 31 in the region of a recess 44 of the outer segments 40. The outer segments 40 are provided each with two guide rollers 45 which are arranged in the region of the recess 44 and enter an oblique guide slot 46 of the thrust ring 43. By a partial rotation of the thrust ring 43, actuated by a pressure medium cylinder 47, the outer segments 40 are displaced in the radial direction in their guides 42 by means of the guide slots 46 and guide rollers 45, so that the outer mould part 29, 29a is opened or closed.

For the production of a tyre 10 in two successive injection actions a tyre injection plant 47 (FIG. 6) or 48 (FIG. 9) is provided which works with at least two complete injection moulds 16 or 16a, 16b respectively. The two injection moulds of a plant differ essentially only as regards the configuration of the outer mould parts 29 or 29a. Here the procedure is adopted that first the side parts 11 are produced in an injection mould with an outer mould part 29 and then a mould component set consisting of upper mould part 27, lower mould part 28 and core 17 with the already injected tyre parts is taken out of the injection mould and inserted into an injection mould having an outer mould part 29a.

Figure 8:
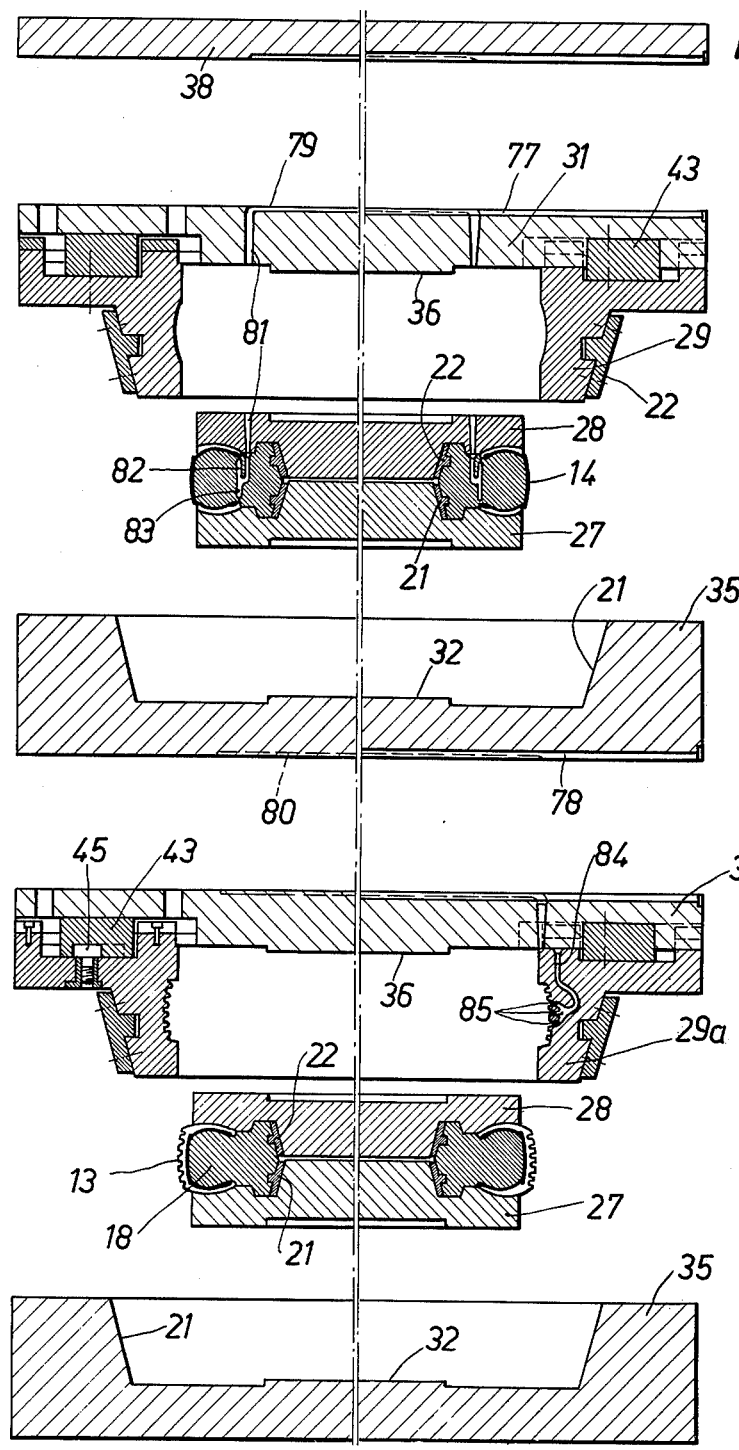

The individual mould parts are coupled to one another by special drag connections for carrying out the above-mentioned exchange of mould parts. In the injection mould 16 according to FIG. 1, a lifting spindle 49 is arranged centrally on the lower mould part 28 and extends through the upper mould part 27 and the closure bell 35. This lifting spindle 49 can be fixed in the region of the closure bell 35, namely by an axially displaceable locking rod 50 which enters from the side. This rod enters an elongated hole or slot 51 of the lifting spindle 49 is such a way that according to the longitudinal or height dimension of the slot 51 relative movements are possible between lifting spindle 49 and locking rod 50. The upper mould part 27 is connected with closure bell 35 through several drag bolts 52 — arranged in distribution. The drag bolts 52 permit a movement clearance between upper mould part 27 and closure bell 35 to an extent which corresponds to the free length of the drag bolt 52, namely as far as abutment of a bolt head 53 on the bottom of a recess 54 in the closure bell 35. This clearance is greater than the movement clearance given by the slot 51. After a first injection action for the production of the side parts 11 and 12, as shown in FIG. 8 firstly the closure bell 35 is lifted away from the upper mould part 27 and the outer mould part 29 by upward movement of the thrust plate 38 and of the parts arranged therebeneath, until the locking rod 50 abuts on the upper limit of the slot 51 in the lifting spindle 49. Due to this lifting movement the outer mould part 29 comes free from the closure bell 35 in such a way that the individual outer segments 40 can be driven apart. During this phase the upper mould part 27, lower mould part 28 and core 17 are held in the closed position by thrust bolts 55 charged each by a cylinder (not shown) and passing through the closure bell 35. By further upward movement of the thrust plate 38 with the closure bell 35 now the upper mould part, lower mould part and core are lifted out of the region of the outer mould part 29, in such a way that the part of the injection mould which has remained behind, namely the outer mould part 29 with mould carrier plate 31 and under plate 33, can be moved or driven out of the region of the press 30. In place of the outer mould part 29 without mould cavity for the tread, an outer mould part 29a with such a mould cavity and the plates 31 and 33 pertaining to this unit is driven into the press. The thrust plate 38 and closure bell 35, upper mould part 27, lower mould part 28 and core 17 are now lowered again into the region of the still open outer mould part. This is then closed again. The material for the tread 13 can now be injected into the mould cavity provided for it, with simultaneous connection with the partly vulcanized side parts 11 and 12.

After termination of the injection operation and subsequent complete vulcanization of the entire tyre 10 the injection mould 16 is opened afresh by upward movement of the thrust plate 38. Previously however the locking rod 50 is drawn out of engagement with the lifting spindle 49. Thus with corresponding upward movement the upper mould part 27 is withdrawn by the action of the drag bolts 52 from the core 17 and the lower mould part 28, after the outer mould part 29a has previously been driven back from the core. The thrust plate 38 with closure bell 35 and upper mould part 27 suspended therefrom are driven upwards until the lower mould part 28 with the lifting spindle 49 seated thereon can be moved out of the region of the press. Now the core 17 with the finished tyre can be lifted out of the lower mould part. Then the tyre is removed from the core.

As illustrated diagrammatically in FIG. 6, such a tyre injection plant 47 can be equipped with a sliding table 56 which is driven to and fro in front of two stationary injection units 57 and 58 and in relation to the press 38 arranged before these injection units 57 and 58. This sliding table 56 is equipped with two mould component sets, each consisting of underplate 33, mould carrier plate 31 and outer mould part 29 or 29a. The abovementioned mould parts are arranged with spacing on the sliding table in such a way that by transverse movement of the sliding table 56 the one or the other mould component set can be fed alternatively to the press 30 and the injection units 57 and 58. Moreover the lower mould part 28 and core 17 are provided in duplicate, so that during an injection action a core 17 can be removed from the mould and prepared for the next injection action. For this purpose in the tyre injection plant 47 according to FIG. 6 corresponding further working stations are provided, namely an alternate station 59 in which the cores 17 prepared for an injection action, namely provided with belt 14 and carcass 15, are taken up and fed to a mould set of the sliding table 56 by a transport device 60 — here represented in simplified form as a pivotable arm — or a core 17 with finished tyre 10 is supplied by the sliding table 56 and delivered. With the alternate station 59 there is associated a preparation station 61 for the assembling and charging of the core 17 with belt and carcass, also a core withdrawal station 62. The core 17 is transported between these stations 59, 61 and 62 by a conveyor 63 — here represented in simplied form as pivotable arm.

In the tyre injection plant 48 according to FIG. 9, in one common press 64 several injection moulds 16a and 16b, namely two in number, are arranged one above the other so that in one injection action a tyre can be completed (lower injection mould 16b) and at the same time also the side parts for a tyre can be produced (upper injection mould 16a), by an appropriate number of injection units. The arrangement of the individual mould parts is here selected as the converse of the form of embodiment according to FIG. 1. The closure bells 35 allocated to the injection moulds 16a and 16b are arranged in each case on the underside of the relevant injection mould. In a corresponding fashion the mould carrier plates 31 carrying the outer mould parts 29 or 29a are provided in each case above the associated injection mould 16a, 16b.

With the tyre injection plant 48 there is associated a vertical conveyor 65. In the present case this is equipped with three lifting platforms 66, 67 and 68. With the aid of these lifting platforms 66 to 68, prepared mould component sets consisting of the core 17 with upper mould part 27 and lower mould part 28 are conveyed to the injection moulds 16a, 16b or conveyed from one injection mould to the other.

The procedure utilized is that a prepared core 17 (with belt 14 and/or carcass 15) is mounted on the lifting platform 66 situated in the upper position and preheated. By lowering of the vertical conveyor 65 by an appropriate amount then this prepared mould component set is fed to the upper, open injection mould 16b. The lifting platforms 66 to 68 are equipped for this purpose with a transverse conveyor, namely a transverse conveyor belt 69 which can be extended out telescopically in the direction towards the injection moulds 16a, 16b. The mould component set resting in each case on the transverse conveyor belt 69 is driven at the level of the open injection mould 16a into the open injection mould 16a by lateral extension of the transverse conveyor belt 69. At the same time the injection mould 16b lying thereheath is charged with a corresponding mould component set, in which however the side parts 11 and 12 have been produced in the injection mould 16a in a preceding injection action.

After the mould component sets have been driven into the open injection moulds 16a, 16b the latter are closed, namely by lowering of the mould carrier plates 31 with the outer mould parts 29 and 29a to the level of the mould component sets upon the transverse conveyor belts 69. Then the segments of the outer mould parts 29 and 29a are driven inwards to abut on the core 17 and on the upper and lower mould parts. Now the transverse conveyor belts 69 can be retracted into the initial position. By further downward movement of the thrust plate 38 of the press 64 the mould parts are applied to the respective closure bell 35, grasped by the latter in the closed position and thus fixed. In the subsequent injection operation at the same time the side parts 11 and 12 are produced in the region of the upper injection mould 16a and the tread 13 of a tyre is produced in the region of the lower injection mould 16b.

After termination of the injection operation and the initial and complete vulcanization the injection moulds 16a, 16b are opened again by converse sequence of movement of the press. The mould component sets are taken up by extended transverse conveyor belts 69 of the lifting platforms 67 and 68, after the vertical conveyor 65 has previously returned into the initial position as illustrated in FIG. 9. The mould component set of the injection mould 16a, after retraction of the transverse conveyor belts 69 into the initial position, is applied by lowering of the lifting platforms 66, 67, 68 to the injection mould 16b, while the lower mould component set is fed by driving of the transverse conveyor belt 69 of the lifting platform 68 to an opposite core-withdrawal station 62 (FIG. 11).

Figure 11:
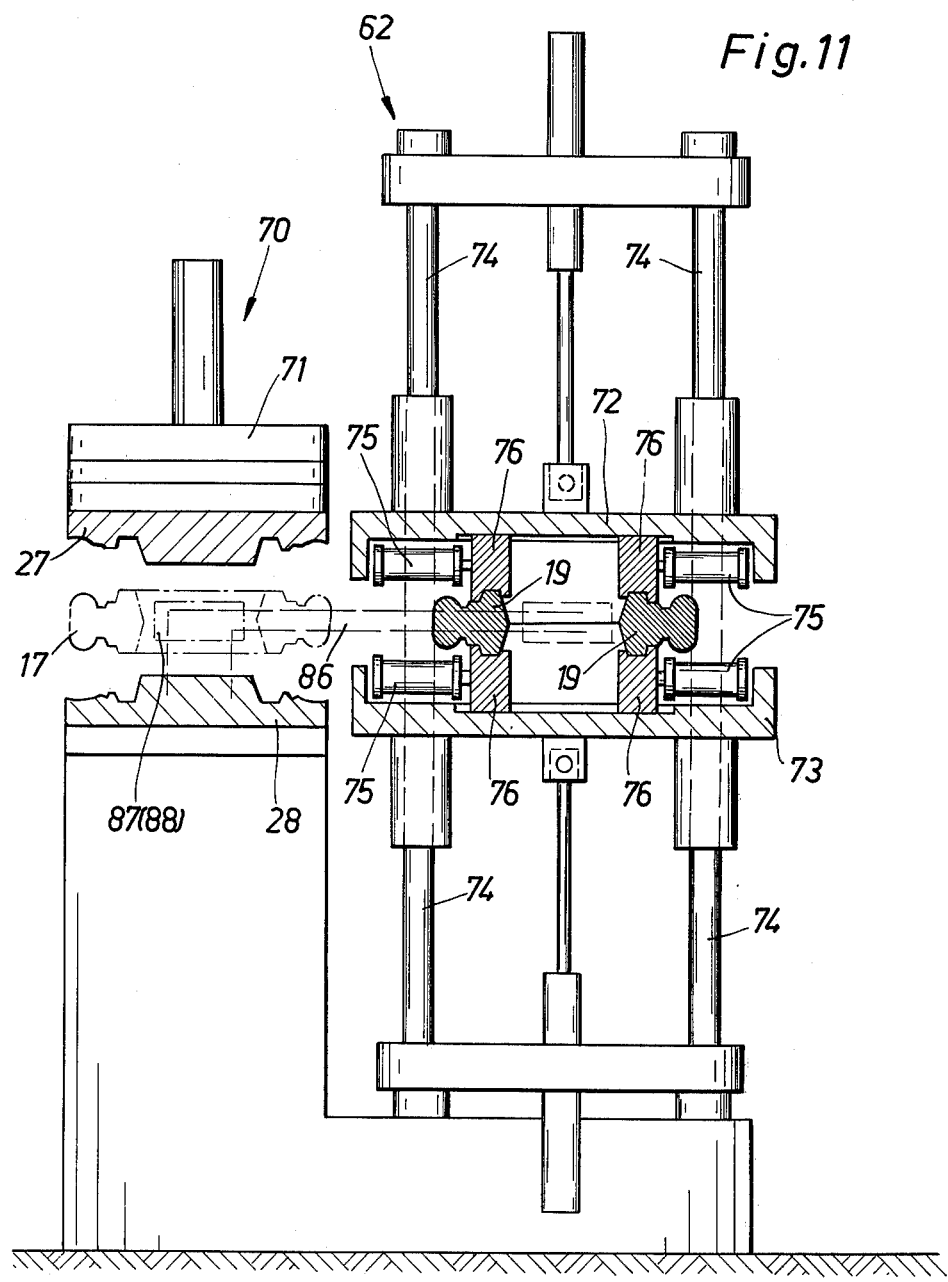
FIG. 11 shows a core withdrawal station in vertical section.
Figure 12:
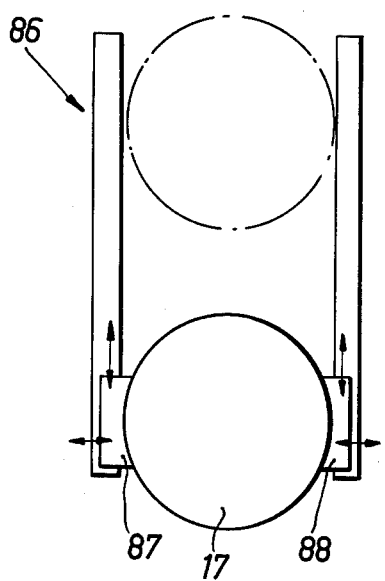
FIG. 12 shows a detail of the core withdrawal station in plan view.

The core withdrawal station 62 is preceded in the example of embodiment according to FIGS. 9 and 11 by a separation point 70 in which the upper mould part 27 and lower mould part 28 are lifted away from the core 17. The core is conveyed by a transport device 86 represented diagrammatically in FIG. 12, which extends into the region of the core-withdrawal station 62. The transport device 86 is equipped with lateral clamping jaws 87, 88 by which the core 17 is grasped. The upper mould part 27 is lifted away from the core by an upper lifting piston 71. The connection between this lifting piston 71 and the upper mould part 27 can be generated for example by magnets, but can also be mechanical. The lower mould part 28 by lowering it from the core 17.

The free core fitted only with the finished tyre 10 is then fed by the transport device 86 to the core-withdrawal station 62 shown in FIG. 11. In the present case this consists of an upper carrier plate 72 and a lower carrier plate 73. The core 17 still grasped by the clamping jaws 87, 88 is accommodated between these carrier plates 72 and 73. The carrier plates 72 and 73 are displaceable in height on vertical spars 74. Thrust elements, pressure medium cylinders 75, are arranged on the side of the carrier plates 72 and 73 facing the core 17. Their piston rods are equipped with pressure claws 76 which due to appropriate formation of the lower and upper parts grasp in each case in shape-locking manner one or more of the parts (segments) of the core. The above-mentioned pressure claws here engage on the foot-like widenings 19 of the core. Thus on adequate application of force, parts of the core are moved towards the centre point by radially inwardly directed movement of the piston rods of the pressure medium cylinders 75. The parts of the core grasped by the pressure medium cylinders 75 or their pressure claws 76 are then moved upwards and downwards with the carrier plates 72 and 73. Thus the tyre comes free from the core.

The core 17 freed of the finished tyre 10 is then reassembled and provided with a belt 14 and/or a carcass 15 and introduced afresh into the production process.

The course of the above working steps for the apparatus according to FIGS. 9 and 11 is reproduced diagrammatically in the illustrations in FIG. 10.

Figure 4:
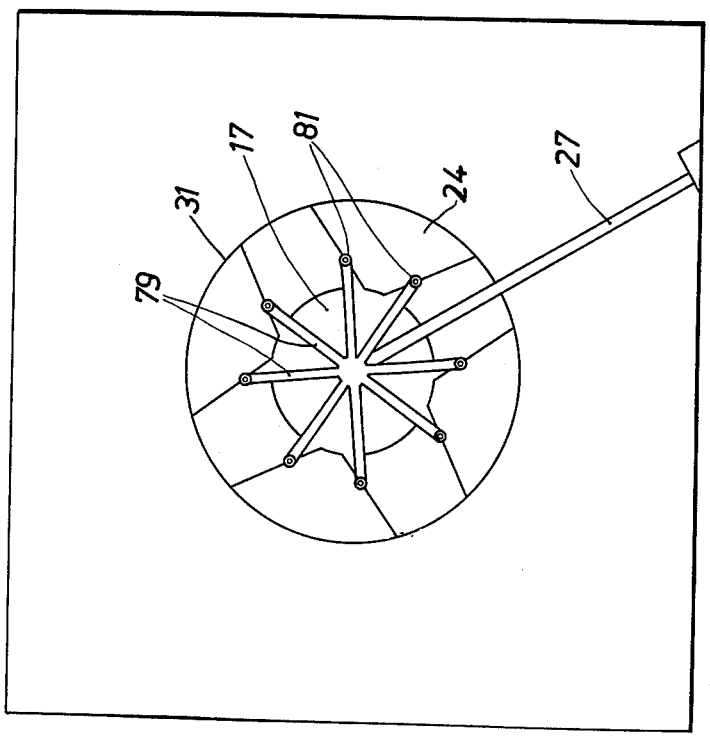

For the supply of the different injection materials to the respective mould cavities, special measures are taken in the present case. As may be seen for example from FIGS. 1, 4 and 5, the materials are fed through different passage systems to the relevant mould cavities. In FIG. 4 the passage system for the production of the side parts 11 and 12 is illustrated, while FIG. 5 shows the passage system for the tread 13 of the tyre. A main passage 77 and 78 is arranged in each case in the region of the plane of separation between the mould carrier plate 31 and the under plate 33. The main passage 77 or 78 leads in each case as far as an imaginary central axis leading through the center point of the core 17. The passage is here joined by radially directed secondary passages 79 and 80 arranged in star form. The (shorter) secondary passages 79 for the side parts 11 and 12 extend in the plane between mould carrier plate 31 and under plate 33 as far as a region lying approximately beneath the inner edge of the mould cavity for the side parts 11 and 12. The secondary passages 79 are conducted with an upright branch 81 through the mould carrier plate 31 and the lower mould part 28 into the core 17. At the level of an (imaginary) central transverse plane of the core the again angled-off branch 81 merges into two distributor passages 82 and 83 which open respectively into the radially inner regions of the mould cavities for the side parts 11 and 12. As may be seen from FIGS. 1 and 4, the upper regions of the branch 81 and the distributor passages 82 and 83 extend in the region of a plane of separation between parts of the core.

The passages for the material of the tread 13 are arranged in a manner similar in principle. The secondary passages 80 of this system extend into a region beneath the tread 13 or the mould cavity provided for it. Then upwardly directed branches 84 join and are conducted through the mould carrier plate 31 into the outer mould part 29a. The branch 84 then opens with a plurality of branching passages 85 into the mould cavity for the tread 13, in the radial direction in relation to the core. The part of the branch 84 extending in the region of the outer mould part 29a and the branching passages 85 are arranged, as may be seen in FIGS. 1 and 5, in the region of a plane of separation between the outer segments 40 of the outer mould part 29a.

In the plant 48 the main passages 77 for the lower injection mould 16b are arranged in the region of the plane of separation between the downwardly situated closure bell 35 of the injection mould 16a and the mould carrier plate 31 of the injection mould 16b. Here an under plate is absent from the injection mould 16b.

We claim:

1. In an injection molding apparatus for producing molded articles having a multipart core defining the inner side of a mold cavity, the core being reduced in size about its external periphery by relative displacement of individual parts for the removal of the article from the mold, a multi-part injection mold, said core inserted into said mold and completely enclosed thereby, said mold having upper, lower and sets of outer mold components, said sets of outer mold components being replaceable to form different sized mold cavities for the successive injection molding actions; the improvement comprising: a first injection molding station for injection molding a first part of said article, said first station disposed in a press, an upper thrust plate associated with said press, a first mold carrier having a first of said sets of outer mold components, a first closure bell for holding said core, said upper and lower mold components and first of said sets of outer mold components to define a first molding cavity, a first injection unit associated with said first molding station, a second injection molding station disposed in said press for molding a second part of said article, a second mold carrier arranged in a force transfer arrangement with said first closure bell, said second mold carrier having a second of said sets of outer mold components, a second closure bell for holding said core, said upper and lower mold components and second of said sets of outer mold components to define a second molding cavity, a base member in a force transfer relationship with said second closure bell, a second injection unit associated with said second molding station, force generating means to move said upper thrust plate toward said base and transmit a closure force through said upper thrust plate and said first and second closure bells to said base for simultaneous molding at said first and second stations, means for transporting said core, said upper and lower mold components with said first part to said second molding station for molding said second part, and means associated with said transporting means for placing and extracting said core, said upper and lower mold components relative to said first set of outer mold components when at said first injection molding station and relative to said second set of outer mold components when at said second injection molding station.

2. An apparatus according to claim 1 wherein said first and second injection molding stations are opened in common by opening of the press, said first and second injection molding stations arranged one above the other and adapted to be lifted away from one another, drag connections coupling said mold components of said first and second injection molding stations such that by upward movement of said upper thrust plate of the press, said first mold carrier with the first of said sets of outer mold components mounted thereon and said first closure bell can be lifted away from one another subsequently at intervals, said means for transporting comprising a vertical conveyor, said conveyor having a plurality of lifting platforms for the reception of said core and said upper and lower mold components.

3. The apparatus of claim 2 wherein said means associated with said transporting means comprises a transverse conveyor, said conveyor extending telescopically to transport said core and said upper and lower mold components into position relative to said sets of outer mold components at both first and second injection molding stations.

4. The apparatus of claim 2 further including a lifting platform for the preparation of said core and upper and lower mold components prior to placement in said first injection molding station.

5. The apparatus of claim 1 wherein said first set and second set of said sets of outer mold components respectively comprise a plurality of segments, said segments being displaceable outwardly and inwardly in relation to each other.

6. The apparatus of claim 5 wherein the segments comprising said first set of outer mold components is supported by said first mold carrier and the segments comprising said second set of outer mold components are supported by said second mold carrier.

7. The apparatus of claim 5 further including a thrust ring, the segments of said outer mold component mounted on said thrust ring, and a plurality of slider guides coupled to the thrust ring, said slider guides radially displacing said segments in relation to each other by rotation of said thrust ring.

8. The apparatus of claim 1 wherein said first and second closure bells are respectively formed with inner surfaces converging towards said sets of outer mold components respectively, said sets of outer mold components having outer surfaces complimentary to the inner surfaces of said first and second closure bells, wherein when said core, upper and lower mold components are placed in each of said closure bells and said first and second mold carriers with said sets of outer mold components are placed over said closure bell, pressure is transmitted from said press to said upper, lower and outer sets of mold components through said inner surfaces of said closure bells.

9. The apparatus of claim 1 wherein said cavities formed by said core and said mold are shaped to mold tires.

10. The apparatus of claim 9 wherein said first molding cavity is torroidal in shape, said first molding cavity molding said first part of said articles comprising: the carcass and side parts of said tires and said second molding cavity being torroidal in shape for molding the second part of said articles comprising the tread of said tires.

11. The apparatus of claim 10 wherein said core is adapted to receive a reinforcement positioned thereabout at said first molding station and said reinforcement being molded to said first part of said tires in said first molding cavity.

* * * * *